United States Patent
de Lamberterie

(10) Patent No.: US 7,278,747 B2
(45) Date of Patent: Oct. 9, 2007

(54) LIGHTING AND/OR SIGNALLING DEVICE WITH LIGHT GUIDE

(75) Inventor: Antoine de Lamberterie, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 276 days.

(21) Appl. No.: 11/197,148

(22) Filed: Aug. 3, 2005

(65) Prior Publication Data

US 2006/0050282 A1   Mar. 9, 2006

(30) Foreign Application Priority Data

Sep. 7, 2004   (FR) ................................. 04 09477

(51) Int. Cl.
*G02B 5/122* (2006.01)
*F21V 5/00* (2006.01)

(52) U.S. Cl. ...................... 359/529; 359/530; 362/245; 362/246; 362/26; 362/27

(58) Field of Classification Search .................... None
See application file for complete search history.

(56) References Cited

U.S. PATENT DOCUMENTS 5,921,652 A   7/1999 Parker et al.

FOREIGN PATENT DOCUMENTS

DE   19857561   6/2000
EP   515921   8/1996

OTHER PUBLICATIONS

French Search Report dated Apr. 20, 2005.

*Primary Examiner*—James Phan
(74) *Attorney, Agent, or Firm*—Morgan & Finnegan, L.L.P.

(57) ABSTRACT

The invention comprises a lighting and/or signalling device in particular for a motor vehicle, comprising: at least one light source illuminating a light guide, part of whose surface has locally diffusing and/or reflective areas able to diffuse/reflect towards the inside part of the light propagating in the guide, at least one end face of the guide remote from the source comprising a means of reflecting light towards the inside of the guide, the reflection means comprising: at least one cube corner projecting outwards having three facets in a trirectangular trihedron, this cube corner being provided in the material of the light guide so as to cause three successive reflections of rays falling on one of the facets under total reflection conditions, in order to return them in the guide in a direction substantially parallel to the incident direction of the said rays, or at least one said cube corner and at least one corner projecting outwards and bevelled, having two facets, this corner being designed to return the incident rays in the guide.

11 Claims, 2 Drawing Sheets

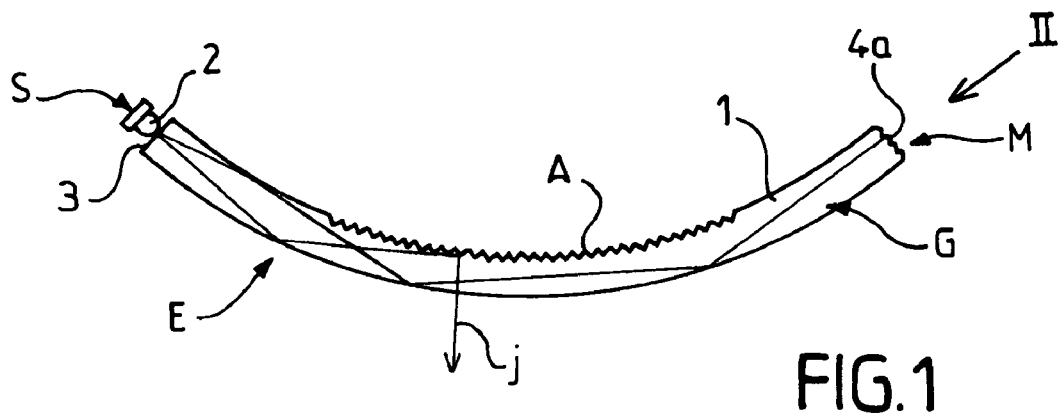
FIG.1
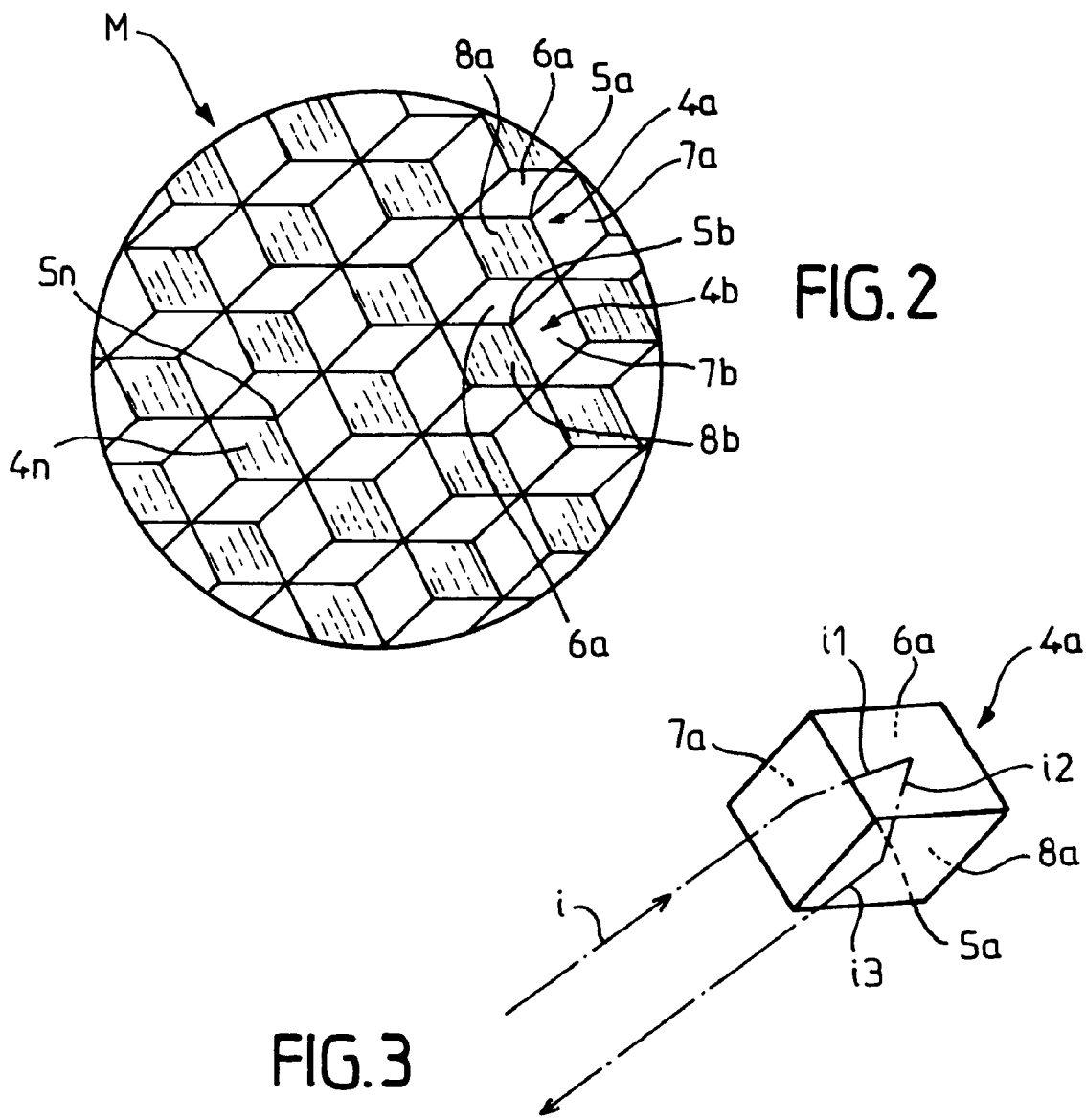
FIG.2
FIG.3

LIGHTING AND/OR SIGNALLING DEVICE WITH LIGHT GUIDE

FIELD OF THE INVENTION

The invention relates to a lighting and/or signalling device of the type comprising at least one light source illuminating a light guide, part of whose surface has roughnesses able to diffuse, towards the outside, some of the light propagating in the guide, at least one end face of the guide remote from the source comprising a means of reflecting the light towards the inside of the guide.

BACKGROUND OF THE INVENTION

The invention concerns more particularly, but not exclusively, such a lighting and/or signalling device for a motor vehicle.

Devices of this type are known, for example, from EP-0 515 921. The end of the light guide opposite to that of the source is made reflective, generally by aluminising, in order to return the light towards the inside of the guide. In the absence of this reflection means, the light would emerge and would be lost. However, the process for making the end reflective, in particular by aluminising, is expensive and requires heavy investment. In addition, it is tricky to aluminise the end of the guide without touching the sides of the guide itself. Finally, reflection on an aluminised face takes place with an additional loss of energy of around 10%.

It will be possible to improve the homogeneity of the appearance of the guide by providing at least one light source at each end of the light guide, but such a solution is much more expensive and an electrical circuit must extend along the guide. This is all the more a nuisance when the light guide is a light emitting diode controlled by an electronic circuit.

The aim of the invention is in particular to provide a lighting and/or signalling device of the type defined above which, whilst being illuminated at only one end, makes it possible to obtain an even appearance with improved light yield, whilst remaining relatively economical to manufacture.

SUMMARY OF THE INVENTION

According to the invention, the lighting and/or signalling device, in particular for a motor vehicle, comprises:
- at least one light source illuminating a light guide, part of whose surface has locally diffusing and/or reflective areas able to diffuse/reflect towards the inside part of the light propagating in the guide,
- at least one end face of the guide remote from the source comprising a means of reflecting light towards the inside of the guide, the reflection means comprising:
- at least one cube corner projecting outwards having three facets in a trirectangular trihedron, this cube corner being provided in the material of the light guide so as to cause three successive reflections of rays falling on one of the facets under total reflection conditions, in order to return them in the guide in a direction substantially parallel to the incident direction of the said rays, or
- at least one said cube corner and at least one corner projecting outwards and bevelled, having two facets, this corner being designed to return the incident rays in the guide.

The light arriving at the end of the guide is returned therein under optimum conditions for its use in the opposite direction and in order to improve homogeneity and performance.

The reflection means preferably comprises several bevelled corners or several cube corners projecting outwards. Advantageously, the diagonal starting from the vertex of the cube corner is parallel to the mean direction of the light guide.

The profiles of the bevelled corners or cube corners are preferably moulded in a single piece with the light guide.

The light guide can have an elongate, cylindrical or prismatic shape. In this configuration, the bevelled corners or the cube corners are preferably provided at a single longitudinal end, the light source or sources being provided at the other end.

The bevelled corner or corners or the cube corners advantageously cover the entire end surface of the light guide opposite to the source.

The light guide can also be in the form of a sheet, at least one large face of which is provided with patterns for diffusing/reflecting the light outwards. In particular in this configuration the light source or sources are placed against one of the edges of the sheet and the bevelled corners or cube corners are provided at least on the opposite edge of the sheet. The bevelled corners or the cube corners can be provided on all the edges of the sheet other than the one illuminated.

The cube corners with three facets or the bevelled corners with two facets have a ridge length preferably of no more than approximately 10 mm and advantageously at least 1 mm. For example, it is approximately 1 to 3 mm, in particular approximately 2 mm. The choice of their sizing depends in particular on the size of the optical guide used, in particular the cross section of the guide that is of a linear type or the thickness of the guide in the form of a sheet or screen. This choice also depends on the number of cube corners or bevelled corners that it is wished to place on the edge of the guide, and their industrial feasibility.

The invention consists, apart from the arrangements disclosed above, of a certain number of other arrangements that will be dealt with more explicitly below with regard to example embodiments described with reference to the accompanying drawings, but which are in no way limiting. In these drawings:

BRIEF DESCRIPTION OF THE DRAWINGS

FIG. 1 is schematic plan view of a signalling device with a light source and an optical guide according to the invention.

FIG. 2 is a view to a larger scale of the end of the guide opposite to the light source, in the direction of the arrow II in FIG. 1.

FIG. 3 is a perspective diagram of the triple reflection of a ray on the three facets of a cube corner.

DESCRIPTION OF THE PREFERRED EMBODIMENTS

Figure 4:
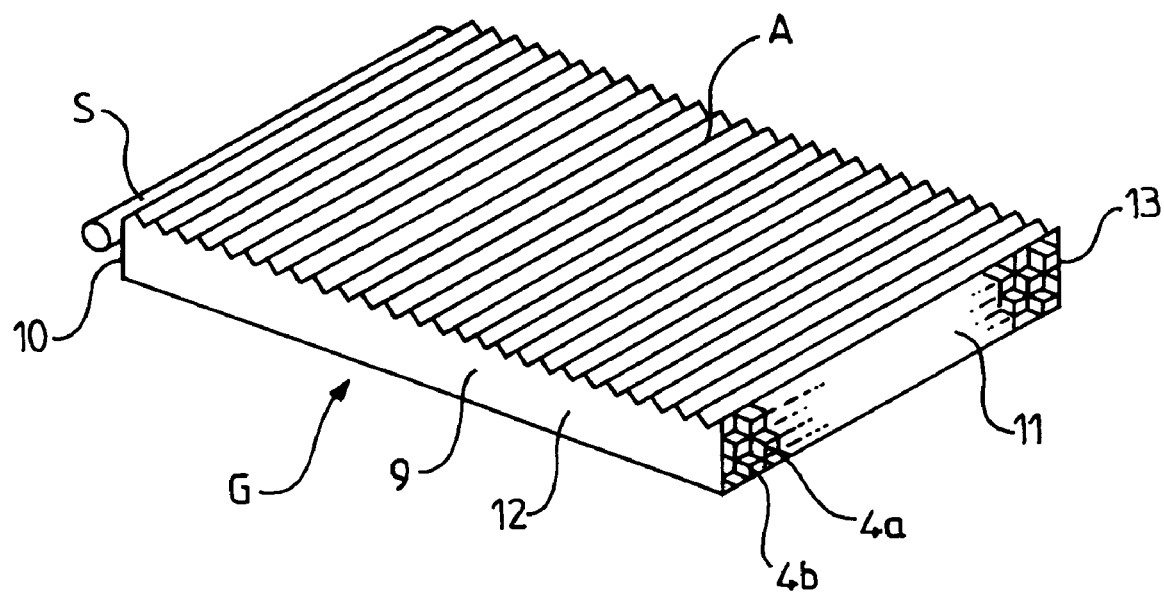
FIG. 4 is a perspective diagram of an optical guide consisting of a sheet.

Referring to FIG. 1 of the drawing, it is possible to see a lighting and/or signalling device E, in particular for a motor vehicle, comprising at least one light source S illuminating a light guide G, part of the surface of which has diffusing patterns/roughnesses A able to diffuse outwards part of the light propagating in the guide.

According to FIG. 1, the guide G is formed by a rod 1 with a circular transverse section. This rod can have the form of a portion of a curve or a portion of a straight line, or the juxtaposition of various curved and/or linear portions. Here, by way of illustration, it is curved in substantially an arc of a circle. The light source S consists, for example, of a light emitting diode or LED 2 applied against a planar end face 3 of the rod 1. The roughnesses A are formed, for example, by serrations provided in the central area of the concave part of the curved rod 1.

The light rays propagate inside the guide 3 and undergo total reflections on the separation surface with the air. Some of these rays fall on the patterns A and are returned towards the outside as illustrated by the ray j.

The end of the rod 1 opposite to the light source 2 comprises a reflection means M and consists of at least one and preferably several cube corners 4a, 4b . . . 4n projecting outwards.

The cube corner or corners cover the entire end surface of the rod 1. Each cube corner has three facets in a trirectangular trihedron. The vertex 5a, 5b . . . 5n of the cube corner projects outwards. In FIG. 2, the three facets 6a, 7a, 8a of a cube corner appear. Assuming that the pattern illustrated in FIG. 2 is illuminated from right to left in a direction substantially inclined at 450, the faces such as 8a are situated in the shadow, which has been represented by interrupted hatching.

The diagonal starting from a vertex such as 5a of a cube corner is preferably parallel to the mean direction of the part of the light guide adjacent to the cube corners.

The light guide 1 is produced from glass or transparent plastics material. The cube corners 4a . . . 4n are advantageously moulded in a single piece with the light guide G.

FIG. 3 illustrates schematically the effect produced by a cube corner. According to FIG. 3, the concave part of the trihedron consisting of the cube corner 4a has been shown, without however showing the rod 1. The vertex 5a is to be considered as being at the rear of the plane of projection: the incident ray i is situated in the material of the rod 1 and falls on the facet 7a without leaving the material of the rod 1. The angle of incidence is such that the ray i undergoes a first total reflection on the facet 7a and is returned, still inside the material of the rod 1, against the facet 6a according to the ray i1. This ray i1 undergoes total reflection on the face 6a in order to be returned according to the ray i2 towards the facet 8a, still inside the material of the rod 1. The ray i2 is reflected by the facet 8a according to the ray i1 parallel to the direction of i, inside the rod 1.

Thus the incident ray i undergoes three successive reflections on the facets of the cube corner and is returned in the guide 1 in a direction parallel to the incident direction i, whatever the orientation of the latter, when the property of total reflection is assured. This is the case for rays that are little inclined with respect to the mean direction of the guide 1 at the end provided with the reflection means M. The little-inclined rays are the most used for providing the light distribution and are the most advantageous.

All the three facets 6a, 7a, 8a which form three planes orthogonal to one another, make it possible to best use the light in the reverse direction in order to improve the homogeneity and performance of the signalling or lighting device.

The length of the ridges of the cube corner is for example less than or equal to 10 mm, in particular around 1 to 2 mm.

The diameter of the rod 1 forming the optical guide can be around 1 cm. The length of the guide 1 can be several tens of centimeters.

Such a device can serve in particular as a sidelight for a motor vehicle, for internal lighting, for example for arm rests, courtesy lights, boot lights, glove box lights, dashboard lights, for illuminating door bottoms, for any ambiance lighting, to emphasise the shapes of the vehicle, or for any other application, in particular for indicator lights.

The profiles of the bevelled corners or cube corners, as already indicated, are obtained with the moulding of the guide. The only additional cost in the piece formed by the guide is related to the tooling of the mould and by the fact that a slide is necessary for taking out the part.

This additional cost is negligible compared with the cost of aluminising the end.

The rays reflected by the cube corners profit from the property of total reflection, whose efficiency in energy terms is 100%.

FIG. 4 illustrates a variant according to which the light guide G consists of a sheet 9 of transparent material, for example substantially parallelepipedal in shape. The diffusing patterns A are provided on one of the large faces of this sheet or plate, in the form of serrations. The light source or sources S are placed against one edge 10 of the sheet 9.

The cube corners are provided at least on the edge 11 opposite to the source S. Optionally, as shown, cube corners 4a, 4b . . . are provided on the other edges 12, 13 of the sheet. However, the presence of the cube corners on the edge 11 suffices to fulfil the required function.

When the source S is switched on, the sheet 9 has on its large face opposite to that provided with the patterns A a homogeneous illuminated appearance.

The advantages disclosed above are retained in the case where the light guide G consists of such a sheet. Diffusing patterns A have been mentioned: alternatively or conjointly, it is also possible to provide, in particular when it is a case of a light guide in the form of a sheet or screen, patterns that are reflective rather than diffusing. One and the same screen can also be provided both with diffusing patterns and reflective patterns.

Alternatively to the cube corners depicted in the figures, it is possible to use bevelled corners, in particular in the case of light guides of the curved or linear type. There are then two facets forming a corner substantially at right angles, like a roof, or a succession of roofs if several of these bevelled corners are juxtaposed. In this case, the rays issuing from the guide striking the bevelled corners are returned in the guide, but not necessarily in a direction parallel to the incident direction. The rays leave again forming an angle with respect to the axis of the optical guide which is symmetrical with respect to the angle between the incident ray and the said optical axis. The absolute value of the angle with respect to the optical axis of the guide thus remains generally unchanged.

What is claimed is:

1. Illuminating and/or signalling device, in particular for a motor vehicle, comprising:
    at least one light source illuminating a light guide, part of whose surface has locally diffusing and/or reflective areas able to diffuse/reflect towards the inside part of the light propagating in the guide,
    at least one end face of the guide remote from the source comprising a means of reflecting light towards the inside of the guide,
    wherein the reflection means comprises:

at least one cube corner projecting outwards having three facets in a trirectangular trihedron, this cube corner being provided in the material of the light guide so as to cause three successive reflections of rays falling on one of the facets under total reflection conditions, in order to return them in the guide in a direction substantially parallel to the incident direction of the said rays, or at least one said cube corner and at least one corner projecting outwards and bevelled, having two facets, this corner being designed to return the incident rays in the guide.

2. Device according to claim 1, wherein the reflection means comprises several bevelled corners or several cube corners projecting outwards.

3. Device according to claim 1, wherein the diagonal starting from the vertex of the cube corner is parallel to the mean direction of the light guide.

4. Device according to claim 1, wherein the profile of the bevelled corners or cube corners, are moulded in a single piece with the light guide.

5. Device according to claim 1, wherein the bevelled corners or the cube corners cover the entire end surface of the light guide opposite to the source.

6. Device according to claim 1, wherein the light guide has an elongate shape, in particular cylindrical or prismatic.

7. Device according to claim 6, wherein the cube corner or corners or the bevelled corner or corners are provided at a single longitudinal end, the light source or sources being provided at another end.

8. Device according to claim 1, wherein the light guide is in the form of a sheet, at least one large face of which is provided with patterns for diffusing or reflecting the light outwards.

9. Device according to claim 8, wherein the light source or sources are placed against one of the edges of the sheet, and in that the cube corners or bevelled corners are provided at least on the opposite edge of the sheet.

10. Device according to claim 1, wherein the edges of the cube corners or bevelled corners have a length of approximately 10 mm at a maximum.

11. Device according to claim 1, wherein it is a case of a vehicle light or vehicle interior lighting.

\* \* \* \* \*